H. W. & E. M. MORRIS.
GLASS CUTTING MACHINE.
APPLICATION FILED APR. 9, 1913.
1,139,054.
Patented May 11, 1915.
5 SHEETS—SHEET 1.
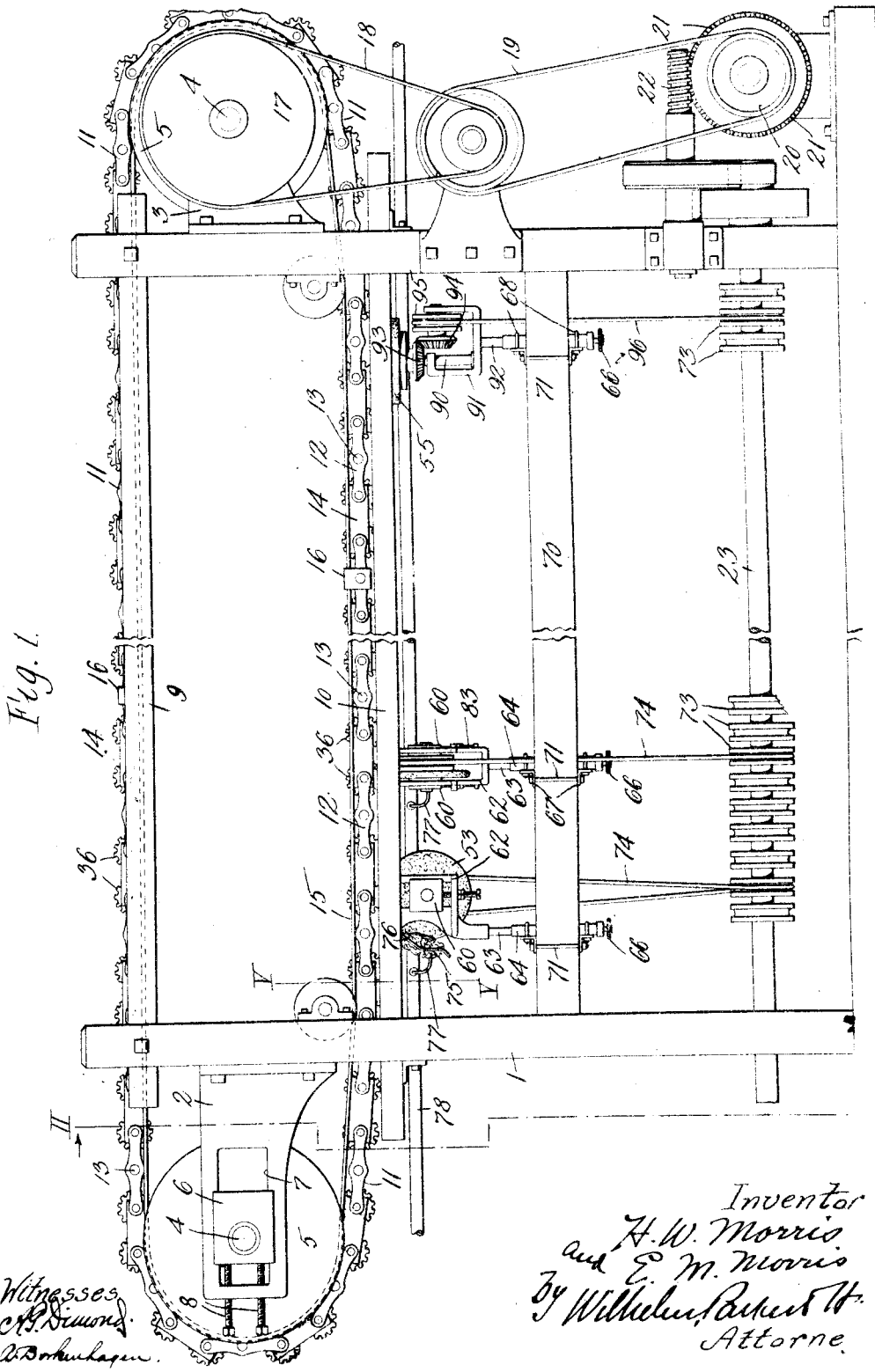

H. W. & E. M. MORRIS.
GLASS CUTTING MACHINE.
APPLICATION FILED APR. 9, 1913.
1,139,054.
Patented May 11, 1915.
5 SHEETS—SHEET 2.
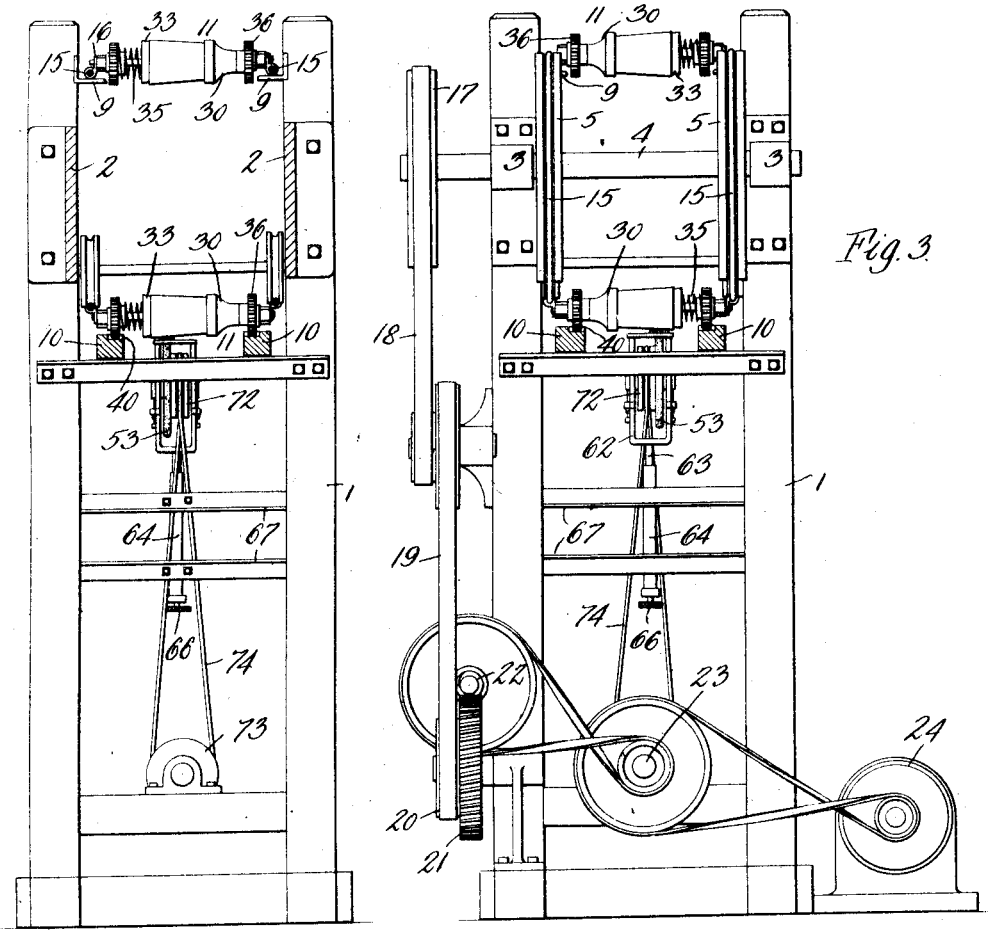
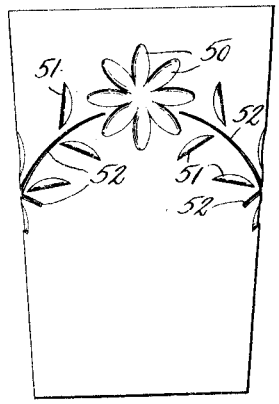
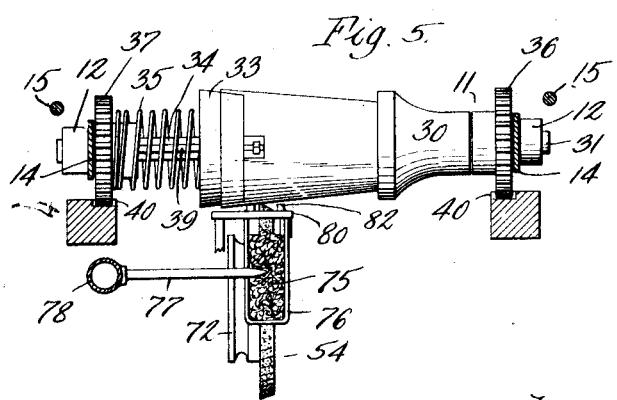
Witnesses
Inventors
H. W. Morris
and E. M. Morris
Attorneys H. W. & E. M. MORRIS.
GLASS CUTTING MACHINE.
APPLICATION FILED APR. 9, 1913.
1,139,054.
Patented May 11, 1915.
5 SHEETS—SHEET 3.
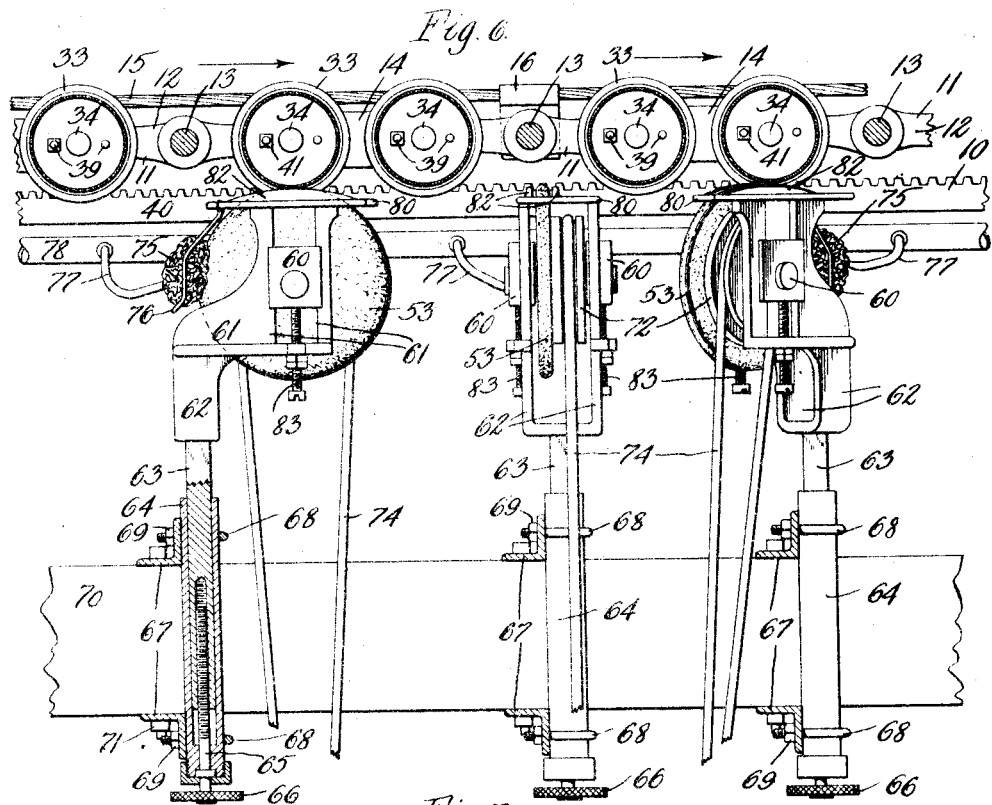
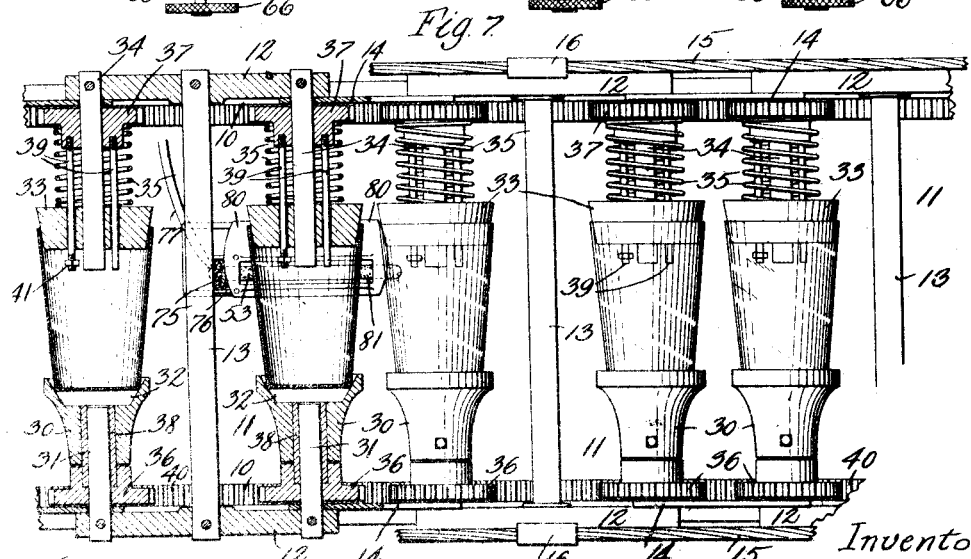
Witnesses.
C. T. G. Dimond
D. Bokenhagen
Inventors.
H. W. Morris
and E. M. Morris
by Wilhelm Parrett Ward
Attorneys H. W. & E. M. MORRIS.
GLASS CUTTING MACHINE.
APPLICATION FILED APR. 9, 1913.
1,139,054.
Patented May 11, 1915.
5 SHEETS—SHEET 4.
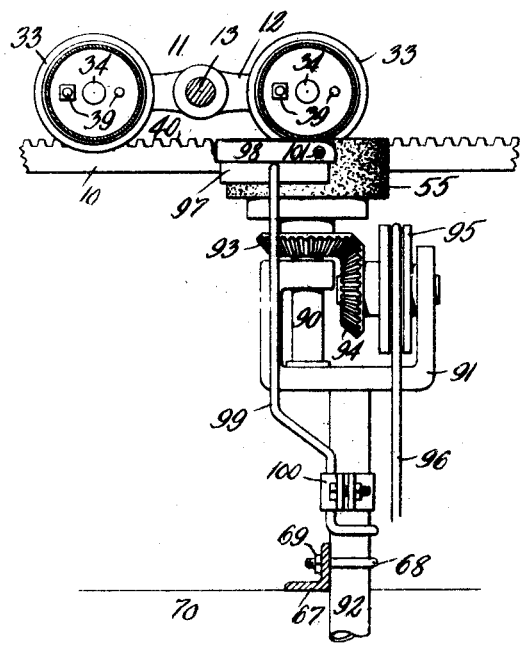
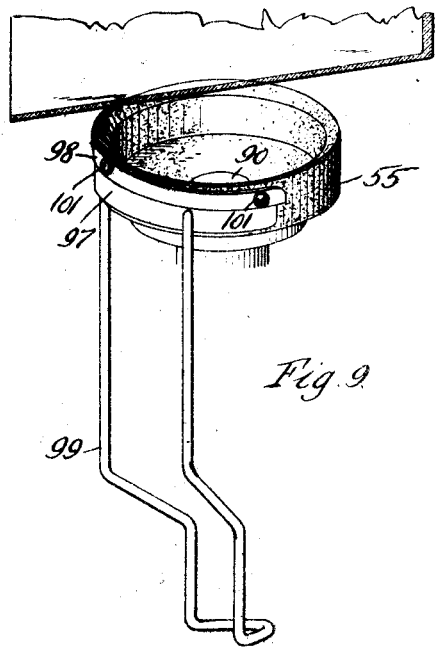
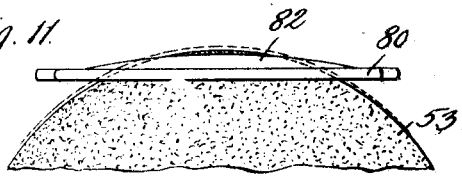
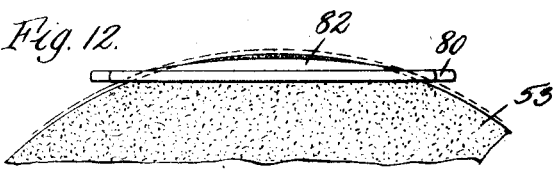
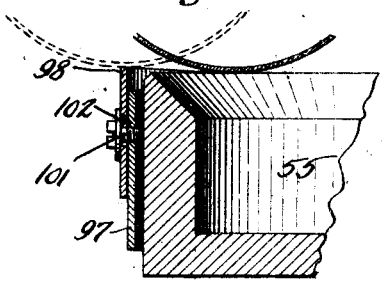
Witnesses
C. F. G. Dimond
A. Borkenhagen
Inventors.
H. W. Morris
and E. M. Morris
By Wilhelm, Parker & Hurd
Attorneys.

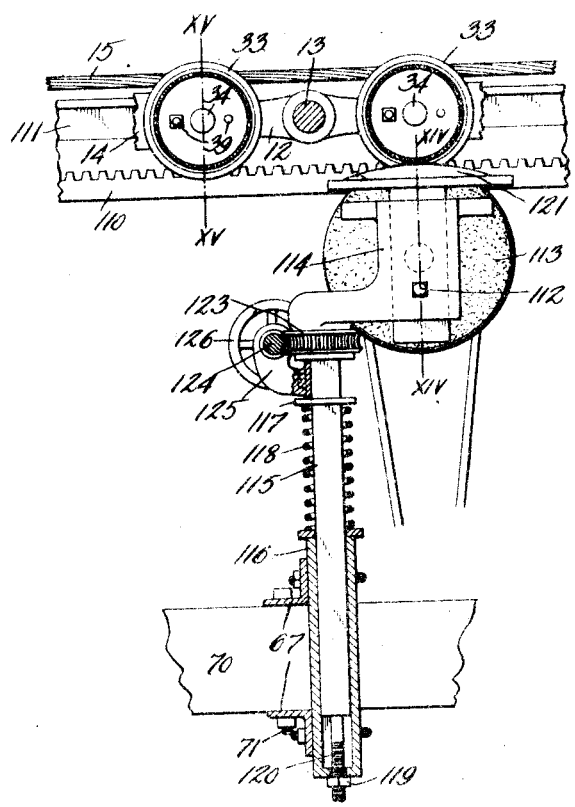

UNITED STATES PATENT OFFICE.

HERBERT W. MORRIS AND EDWARD M. MORRIS, OF BUFFALO, NEW YORK, ASSIGNORS OF ONE-THIRD TO DAVID Z. MORRIS, OF RIDGEVILLE, ONTARIO, CANADA.

GLASS-CUTTING MACHINE.

1,139,054. Specification of Letters Patent. Patented May 11, 1915.

Application filed April 9, 1913. Serial No. 759,876.

*To all whom it may concern:*

Be it known that we, HERBERT W. MORRIS and EDWARD M. MORRIS, citizens of the United States, residing at Buffalo, in the county of Erie and State of New York, have invented a new and useful Improvement in Glass-Cutting Machines, of which the following is a specification.

This invention relates to improvements in machines for cutting ornamental or other designs upon glassware or the like.

In its preferred form it embodies means for automatically cutting a pattern of any degree of complexity upon the surfaces of articles of glassware.

In the accompanying drawings, which illustrate one preferred embodiment of the invention: Figure 1 is a side elevation of a machine, three stones being shown mounted in place therein, but it being understood that as many stones may be used as is found necessary to produce the desired pattern. Fig. 2 is a section on line II—II of Fig. 1. Fig. 3 is an elevation of the rear end of the apparatus. Fig. 4 is an elevation of a tumbler showing one type of design which may be cut by the machine, although it is to be understood that the machine may be used to produce any style of cutting on articles of various shapes. Fig. 5 is a section on line V—V of Fig. 1. Fig. 6 is a side elevation, on an enlarged scale, showing one of the tracks with tumbler carriages thereon and showing three stones and their supporting means, parts being shown in section. Fig. 7 is a plan view of a portion of the track with carriages thereon, one of the carriages and the tumblers carried thereby being shown in horizontal section. Fig. 8 is a detail side elevation showing a crown stone with a tumbler carriage passing thereover, the tumbler carriage and tumblers being shown in section. Fig. 9 is a detail perspective view of a crown stone and guard therefor, a portion of a tumbler being illustrated in contact with the stone. Fig. 10 is a fragmentary vertical section, on an enlarged scale, through the crown stone and its guard and showing a portion of the tumbler. Figs. 11 and 12 are diagrammatic views showing disk stones of different sizes and the guards therefor. Fig. 13 is a side elevation, partly in section, of a modified construction of track, tumbler carriage and support for one of the stones. Fig. 14 is a section on line XIV—XIV of Fig. 13, the stone, driving pulley and guard being shown in elevation. Fig. 15 is a section through a portion of the track and carriage taken on line XV—XV of Fig. 13. Fig. 16 is an edge view of an improved form of cutting wheel. Fig. 17 is an edge view of a wheel of similar construction, but having a grinding surface of different shape. Figs. 18 and 19 are views illustrating cuts made by the wheels shown in Figs. 16 and 17.

The machine illustrated is designed particularly for cutting patterns on tumblers or other articles of approximatetly cylindrical shape, but it is to be understood that the invention is not limited to such use but may be employed for the cutting of other articles of various shapes and made of any material adapted to be cut.

In the construction shown 1 is a suitable framework carrying brackets 2 and 3 which support the shafts 4 of large pulleys 5. The shaft for the pulleys at one end of the machine, for example the front end, are preferably journaled in boxes 6 sliding in slots 7 in the bracket 2, screws 8 being provided to adjust the boxes longitudinally in the slots. Parallel tracks 9 and 10 extend between the pulleys. Traveling along these tracks and over the pulleys at the ends of the apparatus are the carriages 11 for the tumblers or other articles to be cut. Each carriage, in the form of the invention illustrated, is adapted to carry two tumblers and comprises a pair of end members 12 connected by a shaft or cross bar 13 and carrying the tumbler holding mechanism. The carriages 11 are preferably connected to form an endless chain, as by means of the links 14, and they may be propelled by any suitable mechanism, for example, by direct engagement with the pulleys 5. Driving cables 15 are preferably provided, however, which pass over the pulleys and are connected to the chain of carriages at one or more points in any suitable manner, as, for instance, by the clips 16. As will be understood, the carriages may each be connected directly to the cables in which case other connections between the carriages, such as the links 14, could be dispensed with. In addition to propelling the carriages the cables serve as supports for the same while they are passing back over the upper track 9, as shown in Fig. 2. The cables are propelled by the rotation of one pair of pulleys 5 which may be driven in any suitable manner, as by means of a pulley 17 attached to the end of one of the shafts 4 and driven by belts 18 and 19 from a pulley 20 attached to a worm wheel 21. The worm wheel 21 is driven by a worm 22 which is driven by suitable belting or in any other desired manner, from a shaft 23 which is driven from a motor 24. Any other means for transmitting power to the shaft 4 or otherwise driving the cables and carriages may be adopted.

The means for holding the articles to be cut may be of any suitable type and obviously will vary with the nature of the articles. The construction shown which is well adapted for holding tumblers or similar articles comprises a chuck 30 journaled on a short shaft 31 mounted in one of the end members 12 of the carriage. The chuck 30 has a cup-shaped recess 32 to receive the bottom of the tumbler. The open end of the tumbler is engaged by a plug 33 which is slidably mounted upon a short shaft 34 carried by the end member 12 at the opposite end of the carriage, the plug being forced into the end of the tumbler by a spring 35. Means are provided for rotating the tumbler on its own axis so as to present the proper portion of its surface to the action of the cutting wheel, as will be hereinafter explained. This rotation is preferably, but not necessarily, continuous during the cutting operation as well as during the intervals between the making of successive cuts. In the form of the invention illustrated, this axial rotation is imparted to the tumblers by means of gears 36 and 37, the former being attached to the chuck 30 by means of a sleeve 38, while the latter is connected to drive the plug 33 by means of rods 39. The gears 36 and 37 mesh with the teeth of racks 40 which form part of the lower track 10. As the chain of carriages is drawn along it will be seen that the engagement of the gears with the rack will cause a uniform rotation of all of the tumblers carried by carriages passing along the lower track. The tumblers are inserted in their holders by drawing back the plugs 33, inserting the bottoms of the tumblers in the recesses 32 and permitting the plugs 33 to be forced into the open ends of the tumblers by the springs 35. One of the guide rods 39 may be provided with a stop 41 to prevent the plug from coming off when the tumbler is removed.

The cutting of the pattern upon the tumblers is done by means of grinding wheels or stones mounted between the tracks 10 and preferably rapidly revolved. It will be understood that patterns of the kind usually cut upon glassware are made up of a large number of separate cuts so related as to produce the desired appearance, and in the present invention a series of stones or abrading wheels is used, each stone being intended to make a single cut in the surface of the glass, the stones being so placed that when the glass has passed over all of them the cuts will be located on its surface in the desired pattern. Any number of stones may be used so that a pattern having any number of individual cuts may be produced and the stones may be of different characters so as to produce cuts of various kinds. An example of a pattern capable of being cut by the machine of the present invention is shown in Fig. 4. This pattern comprises three kinds of cuts—petals 50, leaves 51 and stems 52. The petals are cut by disk stones having rounded edges and known as punnie stones. Such a stone is illustrated at 53 in Fig. 6. The leaves are cut by disk stones having beveled edges and known as leaf stones, such a stone being shown at 54 in Fig. 5. The stems 52 are cut by crown wheels or stones 55, such as the stone illustrated in Figs. 8, 9 and 10. The disk punnie and leaf stones, such as 53 and 54, are well known in the art, but the crown stone shown in Figs. 8, 9 and 10 is believed to be a new and valuable feature of the present invention. It will be understood that the stones referred to are merely illustrations of those which may be used, as any desired type of stone or abrading device may be employed as required by the pattern which it is desired to cut. The stones are mounted in such manner that they may be adjusted as to elevation and transversely between the tracks so as to place the cuts upon the desired portions of the tumbler surface. The planes of rotation of the disk stones are also capable of being adjusted so as to place the cut at the desired angle upon the surface. As shown, the disk stones are mounted as follows: The shaft of the stone is journaled in boxes 60 which are capable of vertical adjustment between guides 61 formed on the arms 62 of a yoke. The latter is mounted on a column 63, preferably of square or other non-circular section, which slides in a sleeve 64, the outside of which is preferably cylindrical. Means are preferably provided for adjusting the column 63 vertically in the sleeve 64, these means comprising, in the form of the invention illustrated, a screw 65 journaled in the lower end of the sleeve and screwing into an internally threaded socket in the column. A hand wheel 66 is provided for rotating the screw and adjusting the column up or down. The sleeve 64 is supported in any suitable manner to permit of its lateral and angular adjustment. As shown, the sleeve is attached to a pair of cross bars 67 by means of clips 68 and nuts 69, the cross bars being clamped to stringers 70 extending longitudinally of the frame 1, by means of bolts 71. It will be seen that the cross bars 67 may be adjusted on the stringers either longitudinally or laterally of the machine, and that the sleeves 64 may be adjusted angularly and held in position by the clips 68. The column 63 is held against rotation in the sleeve 64, owing to its non-circular section, and thus the plane of rotation of the stone may be determined by adjusting the sleeve 64.

Any suitable mechanism for rotating the stones may be utilized. As shown, a pulley 72 is mounted upon the shaft of each stone, while running longitudinally of the frame of the machine is the driven shaft 23 which is connected to the motor 24 as above described. The shaft 23 has fixed to it a number of pulleys 73 from which power is transmitted to the pulleys 72 by belts 74. Means are preferably provided for keeping the stones wet, the means shown comprising sponges 75 held against the stones by clips 76. The sponges are supplied with water through flexible pipes 77 connected to a longitudinal feeder 78. It is obvious that other arrangements for moistening the stones might be used or that stones might be replaced by wheels of suitable material fed with an abrading substance in the form of dust or paste.

The vertical adjustment of the stones permits the adjustment of the machine for operation upon articles of different diameters. and if the articles to be operated on are all of exactly uniform dimensions the depth of the cut could also be determined in this manner. It is a fact, however, that glass blanks are always found to vary considerably in thickness and other dimensions so that if the tumblers or other articles are moved in a fixed path across a series of fixed stones uniform cuts will not be produced. If the glass is thicker than normal, the cut will be deeper, while if it is thinner the cut will be shallow or will not be made at all. The present invention provides means for compensating for the inequalities of the glass and insuring a cut of the exact depth required in every case. These means comprise the mounting of the glass and the stones in such manner as to permit a relative yielding movement thereof, each stone being provided with a guard which determines the depth of the cut. In the form of the invention illustrated, this guard comprises a plate 80 mounted on the upper ends of the guide bars 61 and having a slot 81 therein through which the upper portion of the stone projects. At each side of the slot are the guide ribs 82 which are designed to engage the surface of the glass. The edges of these ribs are preferably curved to an arc of greater radius than that of the stone. The stone may be adjusted to project more or less beyond these edges by means of the screws 83 which engage the boxes 60 and adjust the boxes between the guide bars 61.

In the form of the invention illustrated in Figs. 1 to 7, the stones and guards are, when once adjusted, mounted in rigid position, the tumblers being held in contact therewith by gravity, so that as they move across the guards they may be lifted by the curved edges of the guide ribs. As the tumblers may yield away from the stones in this manner it will be seen that the depth of the cut is determined definitely by the amount which the edge of the stone projects beyond the guide ribs. The weight of the tumblers and carriages is sufficient to hold the tumblers in contact with the guide ribs and stones so that the maximum cut permitted by the guide ribs is always made. The linking of the carriages together into a chain facilitates the holding down of the tumblers, as each carriage is held down not only by its own weight but to some extent by the weight of the carriages on each side of it. The guide ribs not only determine the depth of the cut made in the tumbler but also determine its length. It will be seen that the tumbler is rotating slowly all the time as it passes over a stone so that the longer the period in which it is in contact with the stone the longer will be the cut made in it. The length of time during which the glass is in contact with the stone depends upon the length of the exposed portion of the periphery of the latter which is determined by the relative curvature of the stone and the edges of the guide ribs. This action of the guide ribs clearly appears from Figs. 11 and 12. Fig. 11 shows a guard applied to a stone of comparatively small diameter, the full lines showing the stone in position to make a short shallow cut. By raising the stone relatively to the guard to the dotted line position it will be seen that a deeper cut will be made. Fig. 12 shows the same guard applied to a stone of larger diameter. It will be seen that the full lines show the stone making a cut of approximately the same depth as the cut made by the small stone shown in Fig. 11 in full lines but of considerably greater length. This is due to the larger diameter of the stone. The raising of the stone to the dotted line position makes the cut deeper without materially affecting its length. The elevation of the stone is preferably so adjusted that it will make the desired cut in a glass of the minimum thickness without lifting the glass substantially. When a thicker glass is brought into contact with the stone it will be raised slightly by its contact with the guide ribs so that the identical cut will be made in it as is made in the thin glass. The variations in the thickness of the glass are, however, not great so that in no case is the glass lifted sufficiently to disengage the gears 36 and 37 from the racks or to interfere with the satisfactory operation of such gears. It is obvious that instead of mounting the glasses in such manner as to permit them to yield, the stones may be mounted to yield as shown, for example, in Fig. 13.

For making curved cuts upon the tumblers or other articles to be cut, one or more crown stones 55 may be employed, as the design may demand. These stones rotate about axes preferably substantially perpendicular to the plane of movement of the surfaces to be cut and have annular cutting edges which rotate substantially in that plane so that the glass surface may be brought into contact with a considerable arc of the cutting edge at the same time. This results in the production of a curved cut which may be made of any desired length. These crown stones may be mounted in any suitable manner. As shown, each is mounted on the upper end of a shaft 90 which is journaled in a frame 91 mounted on a column 92. The column may be slidably mounted in a sleeve, as shown in Fig. 1, or it may be supported in the same way as the sleeves 64 above described, that is, by being secured directly to the cross bars 67 by clips 68, as shown in Fig. 8, although obviously any other supporting means for the column may be utilized. Any suitable form of gearing may be employed for driving the crown stone. As shown, the shaft 90 has a beveled gear 93 fixed to it which meshes with a beveled gear 94 which is driven by means of a pulley 95 and belt 96 from one of the pulleys 73 on the shaft 23. A guard 97 is preferably employed for determining the depth of the cut to be made by the crown stone in a manner similar to the action of the guards used on the disk stones. In its preferred form the guard is provided with a vertically adjustable guide flange 98 which extends approximately half way around the stone, the guard being mounted in such manner that it may be located in any desired position of angular adjustment around the stone. As shown, the guard is supported by a yoke 99 which is secured to the column 92 by a clamp 100. The guide flange 98 is secured to the guard in any suitable manner, as by means of screws 101 passing through vertical slots 102 in the flange. Three screws are preferably employed, one located at each end of the flange and one near the middle so that either end of the flange may be caused to project beyond the cutting edge of the stone or the ends may be depressed and the central portion of the flange raised up above the cutting edge. By the adjustment of the guard circumferentially of the stone and the vertical adjustment of the guide flange, a curved cut may be made of any length up to a complete circle. By raising the central portion of the guide flange and dropping the ends thereof, an interrupted cut may be made. Such a cut is shown in the design illustrated in Fig. 4, in which the stem cut 52 is interrupted in the middle where the flower is placed. The crown stone 55 may have a cutting edge of any desired shape, for example, the cutting edge might be rounded so as to make a punnie cut, or it might have the cross sectional shape of a leaf stone. As shown, the stone has a cutting edge beveled from both sides so as to make what is known as a "miter" cut.

In Figs. 13, 14 and 15 a modified construction is shown in which the stones are so mounted as to be capable of yielding away from the articles to be cut which travel in a fixed path. As illustrated, the lower rails 110 are provided with longitudinal grooves 111 which receive the extended ends 112 of the tumbler holder studs and so prevent the lifting of the tumbler carriages as in the form of the invention above described. In order to provide the necessary relative yielding between the stones and the tumbler carriages to allow for inequalities in the thickness of the glass and for the making of cuts of various lengths in the surface of the glass, the stones are yieldably mounted. As shown, each stone 113 is journaled in a yoke 114 mounted on a column 115 of non-circular cross-section which is adapted to slide vertically in a sleeve 116, which may be attached to the cross bars 67 and stringers 70 as above described, or otherwise suitably supported. The column 115 has a collar 117 fixed thereon which is engaged by a coiled spring 118, the lower end of which rests on the upper end of the sleeve 116. To limit the upward movement of the column a suitable stop is provided, such as the nut 119 screwing on the stud 120 which projects from the lower end of the column. This stop, it will be seen, does not prevent the downward movement of the column but limits the upward movement thereof and it may be adjusted so as to determine the initial elevation of the cutting edge of the stone. The stone is provided with a guard 121, similar to the guard 80 above described and for the same purpose. In this form of the apparatus, however, the guard instead of raising the tumbler, is itself depressed by contact with the latter, thus depressing the yoke 114 and the stone carried thereby. As shown, the guard is mounted to slide vertically in a slot in the yoke, it being held in adjusted position by a set screw 112. It is obvious that instead of this construction, the construction shown in Figs. 1 to 7 could be employed, in which the guide is fixed to the yoke and the stone is journaled in adjustable bearings, and also that the construction shown in Figs. 13 and 14 could be substituted for the construction shown in Figs. 1 to 7, if desired. Fig. 13 also shows a construction which may be utilized to adjust the plane of rotation of the stone. As illustrated, the yoke 114 is pivoted upon the upper end of the column 115 and is provided with a worm gear 123 which is engaged by a worm 124 journaled in a bracket 125 attached to the column. A hand wheel 126 is provided for rotating the worm. By rotating this hand wheel it will be seen that the yoke may be swung upon the upper end of the column and thus the stone may be set to rotate in any desired plane.

Figs. 16 and 17 illustrate two forms of a cutting wheel of novel construction which may be used in the machine if it is needed to produce a particular effect in the pattern to be cut or which may be used advantageously in hand cutting. This novel construction comprises a series of cutting disks 130 of copper or other suitable material adapted to cut or mark the glass separated by layers 131 of inactive material, such as paper or any other substance which will not mark the surface of the glass. By bringing the glass in contact with a wheel of this construction a number of fine parallel lines will be drawn or cut thereon by the edges of the copper disks. In a wheel of this construction built up of alternate layers of active and inactive material, the layers of active material may be made as thin as desired and may be brought very close together so that it is possible to cut very fine lines and place them as close together as is desired. A wheel of this construction may be utilized to produce various effects, for example, to make a leaf or petal or other figure composed of a number of parallel lines, as shown at 132 in Fig. 18, or it may be used in connection with a punnie stone to make a figure such as indicated at 133 in Fig. 18. In making a petal such as indicated at 132, the glass is preferably first hollowed out in the shape of the petal by the use of a punnie stone, after which a wheel of the shape shown in Fig. 16, the periphery of which just fits the depression made by the punnie stone, is utilized to draw or cut the lines in the bottom of the depression. A wheel of the shape shown in Fig. 17 is adapted to cut or mark a flat or convex surface of the glass. Such a wheel may be advantageously employed for producing a checkered pattern such as is indicated at 134 in Fig. 19, by first applying the glass to a wheel rotating in one plane and then to a wheel rotating in a plane at right angles thereto. Wheels of this novel construction are very well adapted to use in a machine of the type herein described but they are also useful for hand cutting as they avoid the laborious and expensive operation of producing figures made up of fine parallel lines or checker work by cutting each line separately as has heretofore been the custom.

From the foregoing description it will be seen that an automatic machine is provided by which a pattern of any design may be cut or marked on a tumbler or other article. In the operation of the particular machine illustrated, the endless chain of carriages may be continuously driven, the tumblers being inserted in the holders as the carriages pass along the upper track or over the pulleys. The tumblers are then drawn along the lower track in their carriages, being slowly rotated through the engagement of the gears on the tumbler holders with the longitudinal racks. The tumblers are thus passed slowly over the successive stones which are so set that each stone produces one of the component cuts of the pattern in its proper location upon the surface of the glass. The stones may be of a variety of types so as to produce the different kinds of cuts required to complete the pattern and any number of stones needed may be used. For example, some patterns require the glass to be passed over fifty or more successive stones. It is to be understood, however, that the invention is not limited to the particular construction of machine set forth. In some cases, for instance where a pattern involves the duplication of a design upon the surface of an article, the article may be passed more than once over the same set of stones, different portions of the surface of the article being presented to the stones so as to duplicate the pattern.

It will be obvious that various modifications in the structure illustrated may be employed, as, for instance, a different type of carrier may be utilized for holding the tumblers and presenting them to successive stones or the tumblers may be mounted to rotate about fixed axes and the series of stones may be so mounted as to be successively presented in proper relation to the articles to be cut. The articles may be rotated continuously or intermittently, or otherwise suitably moved to present proper portions of their surfaces to the action of the stones. In the case of articles having cylindrical or other curved surfaces, it is usually found desirable to rotate the articles about their own axes while in contact with the stones but this rotation is not essential and in the case of articles having flat surfaces would ordinarily be objectionable.

In the claims the cutting elements will be designated, for convenience, as "stones" but it is to be understood that any type of abrading means, whether an actual stone or a metal wheel fed with powdered abrading material, or other construction, is intended to be covered by this term.

We claim as our invention:

1. In a machine of the character described, the combination of a plurality of stones arranged to rotate in relatively different planes, means for presenting the article to be cut to successive stones and for changing the position of the article to present it in different positions to the stones so as to produce a pattern upon said article.

2. In a machine of the character described, the combination of a plurality of stones arranged to rotate in different planes at an angle to each other, means for presenting an article to be cut to successive stones, and means for rotating the article about its axis when in contact with the stones.

3. In a machine of the character described, the combination of a plurality of stones, supporting means for said stones permitting angular adjustment of the planes of rotation thereof, and means for changing the position of the article to be cut to present it in different positions to successive stones.

4. In a machine of the character described, the combination of a plurality of stones, supporting means for said stones permitting angular adjustment of the planes of rotation thereof, and means for conveying a series of articles past said stones and changing the position of the articles for presenting each article in different positions, presenting each article to the action of successive stones.

5. In a machine of the character described, the combination of a plurality of stones, supporting means for said stones permitting angular adjustment of the planes of rotation thereof, means for conveying a series of articles past said stones and presenting each article to the action of successive stones, and means for turning the articles so as to present different portions of the surfaces thereof to the action of successive stones.

6. In a machine of the character described, the combination of a plurality of stones, supporting means for said stones permitting vertical, lateral and angular adjustment thereof, and means for conveying articles past said stones and changing the positions of the articles to be cut for presenting different portions of the surfaces of the articles to the action of successive stones.

7. In a machine of the character described, the combination of a series of stones, supporting means for said stones permitting lateral and angular adjustment thereof, a track adjacent to said stones, a carrier for the article to be cut movable along said track and means for rotating the article.

8. In a machine of the character described, the combination of a series of stones, supporting means for said stones permitting lateral and angular adjustment thereof, a track adjacent to said stones, a carriage movable along said track including a rotatable holder for the article to be cut, a gear fixed to said holder and engaging a rack on said track, and means for propelling the carrier along said track.

9. In a machine of the character described, the combination of a series of stones, supporting means for said stones permitting lateral and angular adjustment thereof, a track adjacent to said stones, carriages movable along said track, rotatable holders for the articles to be cut carried by said carriages, means for propelling said carriages along said track, and means for rotating said holders.

10. In a machine of the character described, the combination of a series of stones, supporting means therefor capable of vertical, lateral and angular adjustment, means for rotating said stones, a track adjacent to said stones, a return track, a series of carriages movable along said tracks, rotary holders for the articles to be cut carried by said carriages, means for propelling the carriages along said tracks, and means for rotating said holders.

11. In a machine of the character described, the combination of a holder for the article to be cut, a stone, and means for propelling one of said members past the other to bring the stone into cutting engagement with the article carried by the holder, at least one of said members being yieldably mounted to yield relatively to the other, and means for regulating the depth of the cut.

12. In a machine of the character described, the combination of a stone, a holder for the article to be cut, means for propelling one of said members by the other to bring the surface of the article in the holder into cutting engagement with the stone, at least one of said members being yieldably mounted, and a guard for the stone adapted to engage the surface of the article to limit the depth of the cut.

13. In a machine of the character described, a rotary cutting stone, and a guard for limiting the depth of cut made by said stone, said guard partially shielding the cutting edge of the stone and leaving a portion of said edge of the stone exposed and being fixed with relation to the axis of rotation of the stone.

14. In a machine of the character described, a rotary cutting stone, and a guard associated therewith for limiting the depth of cut, said guard having a guide edge which is engaged by the article to be cut and which is curved to a longer radius than that of the stone.

15. In a machine of the character described, a rotary cutting stone and a guard associated therewith for limiting the depth of cut, said guard having a guide edge which is engaged by the article to be cut and which is curved to a longer radius than that of the stone, a portion of the periphery of the stone projecting beyond said guide edge, and means for relatively adjusting said stone and guard to vary the amount of projection of the stone.

16. In a machine of the character described, the combination of a rotary cutting stone, and a guard for limiting the depth of cut made by the stone having a slot therein through which a portion of the periphery of the stone projects.

17. In a machine of the character described, the combination of a rotary cutting stone, and a guard for limiting the depth of cut made by the stone having a slot therein through which a portion of the periphery of the stone projects, said guard having a guide rib with a curved edge along one side of the slot through which the stone projects.

18. In a machine of the character described, the combination of a rotary cutting stone, a supporting device therefor, a guard for said stone carried by said supporting device, a portion of the periphery of said stone projecting beyond said guard, and means for adjusting the stone on said supporting device to vary the amount of projection of said stone beyond said guard.

19. In a machine of the character described, a crown stone, and means for moving the article to be cut across said crown stone in a plane substantially perpendicular to the axis of rotation of said stone.

20. In a machine of the character described, a crown stone, and means for moving the article to be cut across said crown stone in a plane substantially perpendicular to the axis of rotation of said stone, and means for rotating the article to be cut about its own axis while it is being passed over said stone.

21. In a machine of the character described, a crown stone, and a curved guard extending around the stone adjacent to the cutting edge thereof.

22. In a machine of the character described, a crown stone, a curved guard extending around the stone adjacent to the cutting edge thereof, and supporting means for said guard permitting circumferential adjustment of the same with relation to the stone.

23. In a machine of the character described, a crown stone, and a curved guard extending around the stone adjacent to the cutting edge thereof, the guide edge of said guard being vertically adjustable.

24. In a machine of the character described, a crown stone, a curved guard mounted adjacent to the cutting edge thereof, and means for moving the article to be cut across said stone in a plane disposed at an angle to the axis of rotation thereof.

25. In a machine of the character described, the combination of a crown stone, a guard therefor, means for adjusting the guide edge of said guard so as to project portions of the same beyond the cutting edge of said stone, and means for moving the article to be cut across said stone in a plane disposed at an angle to the axis of rotation thereof.

26. In a machine of the character described, the combination of a crown stone, means for rotating the same, a track adjacent to said stone, a carriage movable on said track in a plane disposed at an angle to the axis of rotation of said stone, and a holder for the article to be cut mounted on said carriage.

27. In a machine of the character described, the combination of a crown stone, means for rotating the same, a track adjacent to said stone, a carriage movable on said track in a plane disposed at an angle to the axis of rotation of said stone, a holder for the article to be cut mounted on said carriage, and means for rotating said holder.

28. In a machine of the character described, the combination of a crown stone, means for rotating the same, a track adjacent to said stone, a carriage movable on said track in a plane disposed at an angle to the axis of rotation of said stone, a holder for the article to be cut mounted on said carriage, and a guard for said stone, said stone and holder being relatively yieldable.

29. In a machine of the character described, the combination of a series of stones including disk stones and crown stones, supporting means for the disk stones permitting angular adjustment of the planes of rotation of said stones, supporting means for the crown stones, and means for moving the article to be cut in a predetermined path over the series of stones.

30. In a machine of the character described, the combination of a series of stones, guards for said stones, a track mounted adjacent to said stones, and a carrier movable along said track over said stones, said carrier being free to rise from said track when the article to be cut carried thereby engages the guards for said stones.

31. In a machine of the character described, a carriage for the articles to be cut comprising a pair of side members connected by a central transverse member, and article holders carried by the ends of the side members at each side of the transverse member.

32. In a machine of the character described, a carriage for the articles to be cut comprising a pair of connected side members, alined stub shafts projecting inwardly from said side members, gears journaled on said stub shafts, and article engaging members attached to said gears to rotate therewith.

33. In a machine of the character described, the combination of a series of stones, means for conveying an article to present it to said stones in succession, moistening devices associated with said stones, a feed pipe extending adjacent to said stones in the general direction of travel of the article past the stones, and flexible branch pipes leading from said feed pipe to said moistening devices.

34. In a machine of the character described, a stone, a guard therefor, and a clip attached to said guard for holding a sponge in engagement with the periphery of the stone.

35. A machine for ornamenting a surface with a series of separate cuts which combine to form a design, comprising a series of cutting devices, one for making each of the cuts forming the design, said cutting devices being arranged in such relation that when the surface is passed over said cutting devices in a predetermined path the design will be produced, and means for passing such surface over said cutting devices.

36. In a machine of the character described, the combination of a plurality of stones adapted to simultaneously cut a corresponding number of articles, means for holding the articles in cutting relation to said stones and presenting each article to the several stones in succession and means for rotating the articles while in cutting relation to said stone.

37. In a machine of the character described, a rotary cutting stone, means for causing an article to pass said stone, and a guard for regulating the cut made by said stone in the article, said guard having a guide edge for the article extending in the direction of motion of the cutting edge of the stone and adapted to guide the article before and after the engagement of the article with the stone.

38. In a machine of the character described, a rotary cutting stone, means for causing an article to pass said stone, and a guard for regulating the cut made by said stone in the article, said guard leaving a portion of the cutting edge of the stone exposed and extending in the general direction of motion of the cutting edge of the stone to opposite sides of the exposed portion thereof.

39. In a machine of the character described, a rotary disk stone, a rotary crown stone, and means for presenting an article to said stones in succession and changing the position of the article for cutting a design thereon.

40. In a machine of the character described, a cutting stone, means for moving an article to be cut past said stone, and a rack and pinion for rotating the article, said stone and article being arranged to permit one to yield relative to the other as the article passes the stone.

Witness our hands, this 27th day of March, 1913.

HERBERT W. MORRIS.
EDWARD M. MORRIS.

Witnesses:
EDMUND QUINCY MOSES,
A. L. McGEE.